United States Patent

[11] 3,601,741

| [72] | Inventor | Ronald L. Holden<br>Mansfield, Ohio |
|---|---|---|
| [21] | Appl. No. | 851,966 |
| [22] | Filed | Aug. 21, 1969 |
| [45] | Patented | Aug. 24, 1971 |
| [73] | Assignee | Therm-O-Disc, Incorporated<br>Mansfield, Ohio |

[54] THERMOSTAT
11 Claims, 2 Drawing Figs.

[52] U.S. Cl. .................................................. 337/380,
337/354, 337/368
[51] Int. Cl. ................................................. H01h 37/04,
H01h 37/28, H01h 37/54
[50] Field of Search ........................................ 337/112,
347, 349, 354, 365, 368, 371, 380, 373, 374, 375;
200/21, 30, 166.1

[56] References Cited
UNITED STATES PATENTS

| 3,451,028 | 6/1969 | Schmitt | 337/380 X |
| 3,322,920 | 5/1967 | Morris | 337/365 |
| 3,256,413 | 6/1966 | Mertler | 337/379 X |
| 3,164,701 | 1/1965 | Kirchhubel | 337/347 X |
| 2,758,170 | 8/1956 | Jordan | 200/166.1 X |
| 2,724,753 | 11/1955 | Miles | 337/349 X |

Primary Examiner—Bernard A. Gilheany
Assistant Examiner—Dewitt M. Morgan
Attorney—McNenny, Farrington, Fearne & Gordon ABSTRACT: A simplified, low-cost thermostat in which the switch includes a lateral projection engageable with the center of a bimetallic snap disc. The switch retains the disc in position in the body without separate mounting means. The body is symmetrical about a lateral plane so that the switch may be assembled thereon in either of two positions and the switch elements are arranged so that the thermostat can be installed in either of two positions. Means are provided to adjust the switch pressure and operating position after assembly to compensate for variations in tolerances and to eliminate the need of selective assembly.

PATENTED AUG 24 1971

3,601,741

INVENTOR.
RONALD L. HOLDEN
BY
McNENNY, FARRINGTON, PEARNE & GORDON

ATTORNEYS

019
THERMOSTAT

BACKGROUND OF THE INVENTION

This invention relates generally to bimetallic disc operated thermostats and more particularly to a simplified bimetallic snap disc thermostat which may be manufactured at low cost, provides operational reliability, and is suitable for manufacture in small sizes.

In many instances, automatic thermostatic control has not been incorporated into an appliance because of cost and size restrictions. The present invention is directed to a thermostatic structure which is sufficiently small and sufficiently low in cost to permit its economical use even in relatively low-cost or relatively small appliances. The thermostat in accordance with this invention may be manufactured of a small number of simple low-cost parts.

PRIOR ART

Generally, bimetallic snap-disc-operated thermostats incorporate a main body, a switch mechanism mounted on the body, and a bimetallic snap disc. Such snap discs are usually secured to the body by separate retainer means such as a disc-retaining cup and a separate bumper element is guided for movement within the body to operate the switch in response to disc movement. An example of such a thermostat is illustrated in the U. S. Pat. to Bolesky No. 2,954,447.

In order to reduce cost of manufacture and provide a thermostatic structure which can be manufactured in small sizes, various thermostatic structures have been established and manufactured. An example of such a low-cost relatively small thermostat is illustrated in the U. S. Pat. to Morse No. 3,322,920 wherein the disc is retained in the body by the switch and a separate bumper is not required.

SUMMARY OF INVENTION

A thermostat in accordance with the present invention is constructed and arranged to permit low-cost manufacture of a reliable thermostat even when the thermostat must be manufactured in small sizes. The thermostatic structure is arranged to permit adjustment after assembly to compensate for manufacturing tolerances and to ensure proper operation, and is arranged so that the assembly can be accomplished with ease and at a low cost.

In the illustrated embodiment of this invention, the main structural element is a flat or waferlike body. The body is shaped to receive and retain the bimetallic snap disc without the use of separate retainer means. A simple two-part switch is mounted on the body and cooperates with the body to retain the disc in position. The body is formed with adjustment openings so that the switch elements may be adjusted after assembly both with respect to the forces required to operate the switch and with respect to the operating position of the switch. Consequently, it is not necessary to use selective fit techniques and it is not necessary to hold the manufacture of the component parts to extremely close tolerances.

The body is arranged so that the switch elements can be mounted thereon in one of two alternate positions. Therefore, it is merely necessary to orient the body in the holding fixture in one of two positions before assembling the switch thereon. Further, the body and switch elements are proportioned so that the disc can be installed in the thermostat after the switch is mounted thereon.

Because the thermostat incorporating this invention has a simplified structure consisting of a very small number of parts, can be assemblied with ease, and can be adjusted to ensure proper operation after assembly, the thermostat can be manufactured at very low cost without sacrificing reliability of operation and without encountering excessive scrap.

Figure 1:
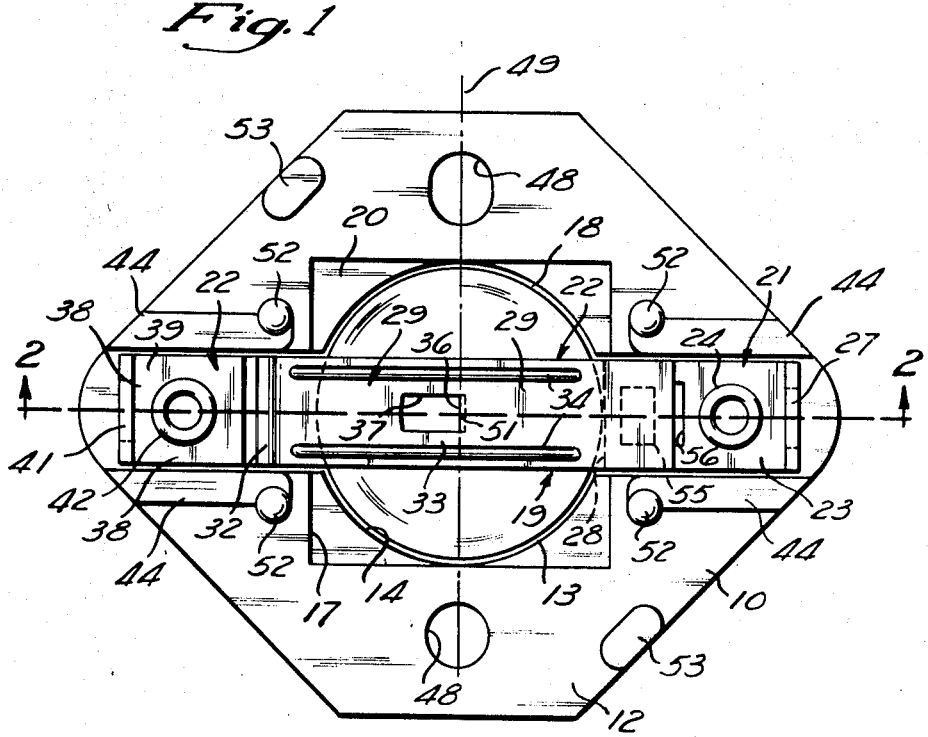
FIG. 1 is a plan view of a preferred embodiment of the thermostat incorporating this invention.

In the illustrated embodiment, a molded plastic body 10 is formed of an electrically insulating material such as a phenolic resin. The body is generally flat or wafer shaped and provides opposed generally parallel first and second surfaces 11 and 12, respectively. The body 10 is formed with a central opening 13 providing a circular portion 14, an inwardly extending flange 16 adjacent to the first surface 11 and an entrance portion 17 extending from the second surface 12 to the circular portion 14.

The circular portion 14 is sized to receive a bimetallic snap disc with slight radial clearance and the flange 16 is sized to engage one side of the disc 18 adjacent to its periphery. The entrance portion 17 is square and extends to a wall 20 parallel to the surfaces 11 and 12.

Mounted along the second surface 12 is a switch assembly 19 including a fixed contact 21 and a mobile contact assembly 22. The fixed contact 21 provides a central portion 23 positioned against the second surface 12 and secured in place by a rivet 24 which extends through the central portion and an opening 26 in the body 10. The fixed contact 21 is also provided with a laterally extending terminal portion 27 and an inwardly extending cantilever contact section 28.

Figure 2:
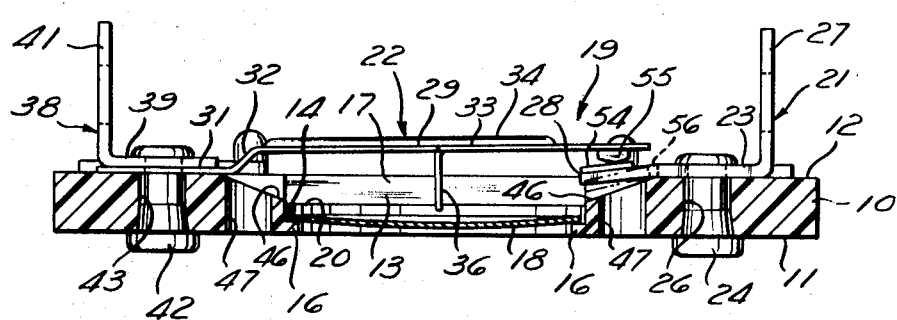
FIG. 2 is a cross section taken along 2—2 of FIG. 1.

The mobile contact assembly 22 includes a cantilever arm element 29 providing a mounting portion 31 positioned against the second surface 12, a laterally extending hinge portion 32 and a cantilever arm portion 33 which extends across the opening 13 to a free end overlying the contact section 28 of the fixed contact. Stiffening ribs 34 are formed in the arm 33 to ensure that the arm moves with a pivotal type movement around the hinge portion 32 and that substantially no bending occurs along the arm portion 33. A lateral projection 36 extends substantially perpendicular to the arm portion 33 toward the center of the disc 18 and terminates at a location spaced from the central portion of the disc 18 when the disc is in the downward position of stability illustrated in FIG. 2. The projection 36 is preferably formed as an integral part of the arm 33 by forming a U-shaped cut 37 through the arm and bending the projection 36 downwardly from the arm as illustrated in FIG. 2.

The mobile contact assembly 22 also includes a terminal element 38 providing a mounting portion 39 overlying the mounting portion 31 and a lateral extending terminal portion 41. A rivet 42 secures the mobile contact assembly in position by extending through the two mounting portions 31 and 39 and an opening 43 in the body 10. In some instances, it may be desired to connect the terminal element 38 to the cantilever arm element 29 by welding, braising, soldering or the like. However, this is not essential since the rivet 42 provides a full connection and secure mounting of both elements.

The body 10 is formed with similar opposed upstanding projections 44 adjacent to the mounting portions of each of the contacts. These projections cooperate with the rivets to ensure that the contacts are in alignment and do not pivot with respect to the rivets to positions of nonalignment. The body 10 is also provided with similar relief sections 46 below the hinge 32 and the contact section 28 so that the hinge portion 32 and the contact portion 28 are not in contact with the body. Similar adjustment passages 47 extend through the body 10 and open through each of the relief portions 46 to provide access to the underside of the contact section 28 and the hinge portion 32. The purpose of these adjustment passages is described in more detail below.

The body is also formed with a pair of openings 48 on opposite sides of the central opening 13 through which suitable fasteners may be inserted to mount the thermostat in an appliance or the like. The openings 48 are preferably located along a lateral plane 49 containing the central axis 51 of the opening 13 and extending perpendicular to the length of the contacts. In the illustrated embodiment of the body 10 is also formed with four upstanding projections 52 and two upstanding projections 53 which may be used as locating surfaces for mounting the thermostat in an appliance.

An inspection of FIG. 1 will illustrate that the body 10 is symmetrical with respect to the lateral plane 49 and that if it is turned about its axis 51 through 180°, a similar configuration will result. Therefore, the body 10 can be oriented in either of two positions for assembly of the contacts thereon. This improves the ease of assembly and reduces labor costs since the insertion of the body into an assembly fixture can be in either of two positions. Also, the terminal portions 27 and 41 and the rivets 24 and 42 are similar in size and in location with respect to the lateral plane 49. Therefore, the thermostat can be mounted in most appliances in either of two positions, 180° of rotation around the axis 51 from each other without affecting operation. Here again, this feature improves ease of mounting the thermostat into the appliance and therefore reduces labor costs.

Preferably, the thermostat is assembled as follows. The body 10 is positioned in either of its positions in an assembly fixture. The disc 18 may then be positioned in the opening. The fixed contact is positioned and riveted. Subsequently, the mobile contact assembly is properly positioned and riveted. If the disc 18 has not already been positioned, it is then inserted along the entrance portion into the circular portion 14 wherein it is retained by the projection 36. The metal forming the cantilever arm 33 is preferably selected and sized so that it can spring up to allow the final movement of the disc into the circular portion without stressing it beyond its elastic limit. This structure permits preliminary partial assembly of the thermostat followed by insertion of a disc having the temperature characteristics required by a particular customer.

The depth of the circular portion 14 is proportioned so that the edge of the disc remains in the circular portion even when the disc snaps and when the thermostat is inverted and rests at its center against the projection 36 and at one point on its edge against the flange 16. This ensures that the disc will remain in position once assembly is completed.

In the illustrated embodiment, the fixed contact is provided with a contact button 54 and the mobile contact is provided with a button 55. Preferably, the contact button 55 is formed with a curved contact surface constituting part of a cylinder extending laterally with respect to the arms so that adjustment of the fixed contact section 28, described below, will not adversely affect the contact function. The contact button 54 can be eliminated if desired. In such assemblies, the fixed contact may be plated with a good conducting material such as silver.

When a thermostat utilizes a relatively small disc, for example, in the order of a ½-inch disc, the amount of snap travel between its two positions of stability is quite small and the forces available for the operation of the switch are small. It is therefore generally necessary to either form the components of the thermostat with great precision to ensure reliable operation, or to provide means to permit adjustment of the thermostat assembly to compensate for variations in manufacturing tolerances. The cost of manufacture is drastically increased if the elements of a combination must be manufactured to extremely close tolerances. Therefore, in the present invention, means are provided to permit adjustment after assembly to permit the use of elements which need not be manufactured to extremely close tolerances.

In a thermostat of this type, there are usually two critical conditions. First, the spacing of the end of the projection 36 from the central portion of the disc 18 when the disc 18 engages the flange must be such that the switch opens and closes while the disc is moving with snap action. Secondly, the stresses in the cantilever arm tending to urge the contacts closed must have a value which is sufficiently large to ensure adequate switch contact pressure and sufficiently small to permit the switch to be opened by the disc.

In the illustrated embodiment, the structure is arranged to provide adjustment to ensure that the switch will operate in both directions with snap action. This adjustment is provided by arranging the fixed contact section 28 so that it can be bent either up or down to the required position. The fixed contact is provided with a lateral notch 56 adjacent to the intersection between the relief portion 46 and the second surface 12. This ensures that adjustment results in substantially pivotal action. Normally, the fixed contact is formed so that the contact section 28 extends below its final position substantially along the phantom-line position of FIG. 2. After assembly, a gauge is inserted between the projection 36 and the disc and a tool is inserted through the associated adjustment passage 47 and the cantilever section 28 is bent up until contact closure occurs and the full-line position is reached. This adjustment automatically compensates for variations in tolerances of the components of the assembly and ensures proper switch operation with snap action. Since the upper side of the fixed contact section 28 is accessible, it can be pushed back down slightly with an appropriate tool in the event that its position is too high. Similarly, adjustment of the force tending to close the contacts can be accomplished by bending of the hinge portion 32 either from above or from below through the associated adjustment passage 47. Therefore, it is a simple matter to adjust the contact pressure of the assembled switch after assembly, if it is necessary to do so.

Since the illustrated thermostat can be easily assembled, the assembly costs are low. Further, the cost of the thermostat is minimized by the fact that a relatively small number of parts are required and by the fact that it is not necessary to hold extremely close tolerances in the manufacture of the elements of the thermostat. When the thermostat is manufactured utilizing a ½-inch disc, the overall thickness of the thermostat excluding the terminal portions, may be less than one-quarter of an inch. The overall length of such a thermostat is in the order of 1⅜ inches and its width is only slightly more than 1 inch. Therefore, a small, low-cost, reliable thermostat can be provided in accordance with this invention.

Although a preferred embodiment of this invention is illustrated, it is to be understood that various modifications and rearrangements may be resorted to without departing from the scope of the invention disclosed.

What is claimed is:

1. A thermostat comprising an electrically insulating body, a central opening through said body providing a circular portion and an inwardly extending flange adjacent to one side thereof, a bimetallic snap disc within said circular portion providing a periphery engageable with said flange, a fixed contact, a mobile contact, first and second fasteners respectively securing said fixed and mobile contacts to said body on diametrically opposite sides of said opening, said mobile contact providing a cantilever portion extending across said opening on the side of said disc opposite said flange and having a free end movable into and out of engagement with said fixed contact, a lateral projection on said cantilever portion extending to a location adjacent the central part of said disc, said disc being movable with snap action between first and second positions of stability and operating when it moves to said first position to engage said projection and move said free end relative to said fixed contact, said projection maintaining said disc in said circular portion, said body being formed with an open adjustment passage therethrough between and spaced from both said first fastener and said opening, said fixed contact providing a cantilever section engageable by said free end, said cantilever section being spaced from said body and extending over said adjustment passage, said adjustment passage providing access to one side of said cantilever section for the insertion and removal of a tool for adjustment thereof after said disc is in position within said circular portion, said cantilever section being sufficiently rigid to maintain its adjusted position during normal operation of said thermostat.

2. A thermostat as set forth in claim 1 wherein said body is symmetrical with respect to a lateral plane through said central opening and is shaped to permit said contacts to be mounted on either side of said opening without changing the physical or functional configuration of said thermostat.

3. A thermostat as set forth in claim 1 wherein said mobile contact is formed of spring material having an elastic limit, and said body is formed with an entrance section adjacent to said circular portion along which said disc may be inserted into said opening after said contacts are mounted thereon without stressing said mobile contact beyond its elastic limit.

4. A thermostat as set forth in claim 1 wherein part of the material of said cantilever portion of said mobile contact is notched and bent to extend laterally therefrom to form said projection.

5. A thermostat as set forth in claim 1 wherein said thermostat is symmetrical with respect to a lateral plane through said central opening, said thermostat being installable in an appliance in either of two positions without changing the physical or functional configuration of such installation.

6. A thermostat as set forth in claim 1 wherein a second adjustment passage is formed in said body between said second fastener and said opening, and said mobile contact provides a hinge portion and spaced from said second adjustment passage and accessible through said second adjustment passage, said cantilever section of said fixed contact and said hinge portion being accessible on the sides thereof remote from said adjustment passages.

7. A thermostat as set forth in claim 6 wherein said disc and projection are proportioned so that they are spaced when said disc is in said second position and its periphery engages said flange, and said circular portion is formed with sufficient depth so that said disc is maintained therein by said projection when said disc is in said second position.

8. A thermostat as set forth in claim 7 wherein a contact button is secured to said free end for engagement with said fixed contact, said contact button being formed with a contact surface curved in the lengthwise direction of said cantilever portion.

9. A thermostat as set forth in claim 8 wherein said body is symmetrical with respect to a lateral plane through said central opening and is shaped to permit said contacts to be mounted on either side of said opening without changing the physical or functional configuration of said thermostat.

10. A thermostat as set forth in claim 9 wherein part of the material of said cantilever portion of said mobile contact is notched and bent to extend laterally therefrom to form said projection.

11. A thermostat as set forth in claim 10 wherein said mobile contact is formed of spring material having an elastic limit, and said body is formed with an entrance section adjacent to said circular portion along which said disc may be inserted into said opening after said contacts are mounted thereon without stressing said mobile contact beyond its elastic limit.

UNITED STATES PATENT OFFICE
CERTIFICATE OF CORRECTION

Patent No. 3,601,741  Dated August 24, 1971

Inventor(s) Ronald L. Holden

It is certified that error appears in the above-identified patent and that said Letters Patent are hereby corrected as shown below:

Claim 6, line 16, insert -- overlying -- after "portion" and before "and".

Signed and sealed this 14th day of March 1972.

(SEAL)
Attest:

EDWARD M. FLETCHER, JR.
Attesting Officer

ROBERT GOTTSCHALK
Commissioner of Patents